US 6,718,787 B1

(12) United States Patent
Hille et al.

(10) Patent No.: US 6,718,787 B1
(45) Date of Patent: Apr. 13, 2004

(54) SUPPLY AIR BLOWER DESIGN IN BUS AIR CONDITIONING UNITS

(75) Inventors: Andreas Hille, Renningen (DE); Robert C. Reimann, LaFayette, NY (US); Belin Czechowicz, Dewitt, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/429,456

(22) Filed: May 5, 2003

(51) Int. Cl.[7] ............................................... F25B 47/00
(52) U.S. Cl. ......................................... 62/279; 62/429
(58) Field of Search ........................... 62/279, 262, 244, 62/429, 508, 280

(56) References Cited

U.S. PATENT DOCUMENTS

| | | | | |
|---|---|---|---|---|
| 3,756,039 A | * | 9/1973 | Riello ........................... | 62/262 |
| 4,641,502 A | * | 2/1987 | Aldrich et al. ................. | 62/244 |
| 4,672,818 A | * | 6/1987 | Roth ........................... | 62/239 |
| 5,094,089 A | * | 3/1992 | Lail ............................ | 62/429 |
| 6,357,249 B1 | * | 3/2002 | Robinson et al. .............. | 62/285 |

FOREIGN PATENT DOCUMENTS

| | | | | |
|---|---|---|---|---|
| JP | 411198639 A | * | 7/1999 | |
| JP | 411208259 A | * | 8/1999 | |

* cited by examiner

Primary Examiner—Melvin Jones
(74) Attorney, Agent, or Firm—Wall Marjama & Bilinski LLP

(57) ABSTRACT

A compact rooftop air conditioning unit for a vehicle, such as a bus, having an evaporator coil located in front of a condenser coil. A plurality of cylindrical blowers are mounted adjacent the evaporator coil and arranged to provide conditioned supply air to the interior of the vehicle. A single electric motor is connected to an elongated drive shaft which drives the blowers. A condensate pump is included for pumping condensate generated by the evaporator coil back over the condenser coil. An electrically driven compressor is housed within the unit and is arranged so that no refrigerant lines pass outside of the unit. An inverter is also housed within the unit and provides a regulated input to the compressor and the blower drive motor.

6 Claims, 4 Drawing Sheets

SUPPLY AIR BLOWER DESIGN IN BUS AIR CONDITIONING UNITS

CROSS REFERENCE TO RELATED APPLICATIONS

This application is related to the following pending applications being concurrently filed herewith and assigned to the assignee of the present invention:

| Title | Our Docket No.: |
| --- | --- |
| Modular Rooftop Air Conditioner for a Bus | 210_546 |
| Modular Bus Air Conditioning System | 210_545 |
| Supply Air Blower Design in Bus Air Conditioning Units | 210_549 |
| Bus Rooftop Condenser Fan | 210_550 |
| Method and Apparatus for Refreshing Air in a Bustop Air Conditioner | 210_548 |
| Coil Housing Design for a Bus Air Conditioning Unit | 210_547 |
| Integrated Air Conditioning Module for a Bus | 210_558 |
| Fresh Air Intake Filter and Multi Function Grill | 210_554 |
| Integrated Air Conditioning Module for a Bus | 210_557 |
| Modular Air Conditioner for a Bus | 210_561 |
| Modular Air Conditioner for a Bus Rooftop | 210_562 |
| Evaporator Section for a Modular Bus Air Conditioner | 210_564 |
| Wide Evaporator Section for a Modular Bus Air Conditioner | 210_565 |
| Condensate Pump for Rooftop Air Conditioning Unit | 210_568 |
| Condensate Removal System Rooftop Air Conditioning | 210_551 |
| Modular Rooftop Unit Supply Air Ducting Arrangement | 210_577 |
| Configuration for Modular Bus Rooftop Air Conditioning System | 210_595 |
| Unibody Modular Bus Air Conditioner | 210_596 |

FIELD OF THE INVENTION

This invention relates in general to an air conditioning unit and more specifically to a rooftop air conditioning unit for a vehicle such as a bus.

BACKGROUND OF THE INVENTION

The most common approach for air conditioning the interior of a bus is to mount the air conditioning components on the roof of the vehicle. It has been the common practice in the industry to locate the compressor for the unit in the vehicle motor compartment so that it can be driven directly from the engine. The compressor, in turn, must be connected to the air conditioning unit by means of refrigerant supply and return lines. This requires running an extensive amount of piping through the bus between the engine compartment and air conditioner.

in existing bus air conditioning units, 24 V DC double radial blowers are commonly used to blow the supply air stream into the vehicle. The blower assembly contains the blower motor, the blower housing and the blower wheel. The complete assembly is mounted to the evaporator housing. To create the required supply air flow, multiple small double radial blowers are used with multiple small DC motors. The number of blower motors and wiring add to the cost of the system, and present a problem with respect to serviceability and accessability of the blower motors because of their placement in the system.

SUMMARY OF THE INVENTION

It is therefor an object of the present invention to provide an improved air conditioning unit that is mounted upon the roof of a bus or other similar type of vehicle.

It is a further object of the present invention to provide an improved air blower design for an air conditioning unit that is mounted upon the roof of a bus.

It is another object of the present invention to reduce the number of blower motors and wiring in a low profile air conditioning unit that is mounted upon the roof of a bus.

An other object of the present invention is to provide for an increase in efficiency by improving the air flow into a radial blower housing for a rooftop air conditioning unit of a vehicle.

These and other objects of the present invention are attained by a compact rooftop air conditioning unit for a bus or similar type vehicle that contains an electrical driven compressor and an inverter for regulating the electrical input to the electrical components contained within the unit. The evaporator coil of the unit is mounted in front of the condenser coil and a plurality of cylindrical blowers are mounted adjacent the evaporator coil upon a horizontally disposed shaft which, in turn, is rotated by an electrical motor. A drip pan is positioned beneath the evaporator coil and is arranged to pass the collected condensate into the sump of the pump housing through an inlet port.

In the present invention a single blower motor is mounted on the side of the unit. This blower motor drives an elongated blower shaft, which is supported through a shaft bearing mounted at its end. A plurality of blower wheels are directly mounted to, and driven by the blower shaft.

BRIEF DESCRIPTION OF THE DRAWINGS

For a further understanding of these and objects of the invention, reference will be made to the following detailed description of the invention which is to be read in connection with the accompanying drawings, wherein.

DETAILED DESCRIPTION OF THE INVENTION

Figure 1:
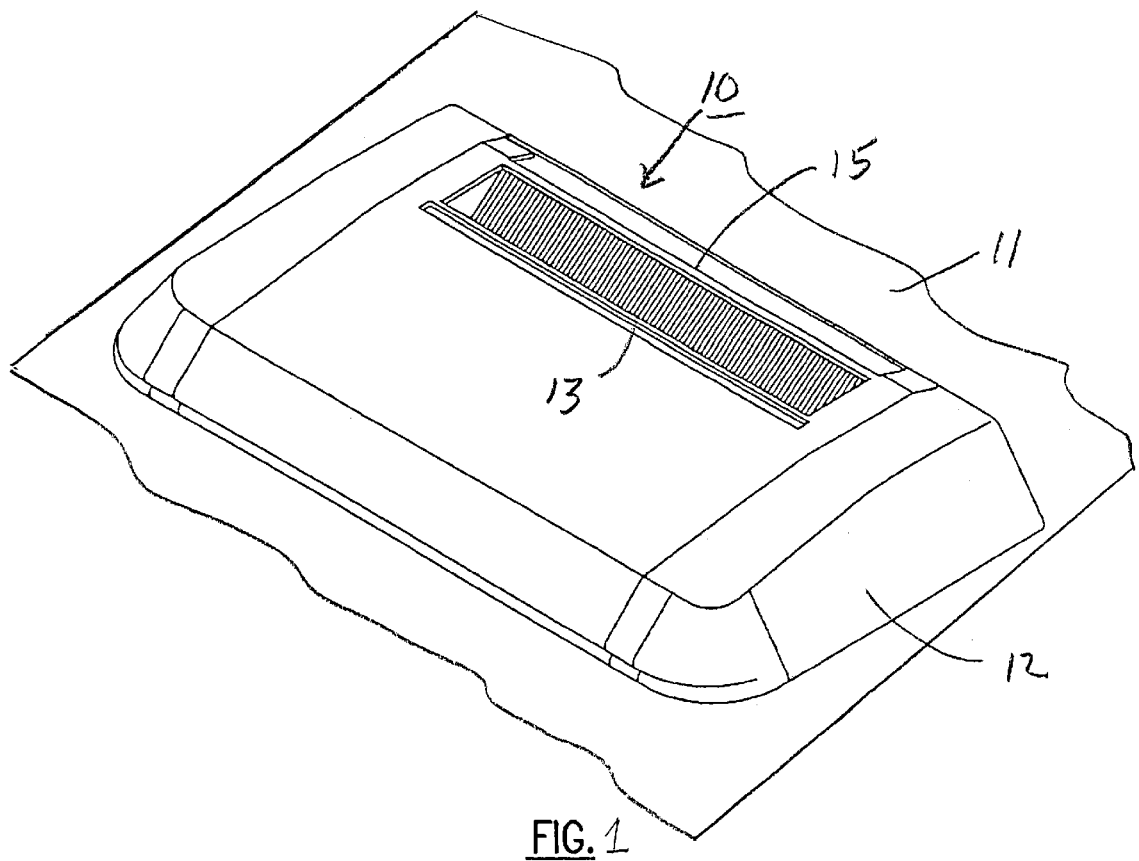
FIG. 1 is a perspective view of a compact air conditioning unit suitable for mounting on the roof of a vehicle and, in particular, the roof of a bus.

Referring to the drawings, FIG. 1 illustrates a low profile, compact, air conditioning unit, generally referenced 10, that is ideally well suited for mounting upon the roof 11 of a vehicle such as a bus. The working components of the unit are housed in a stream-lined protective cover 12 preferably fabricated of plastic. The cover contains an elongated opening 13 that extends laterally along the top of the cover. A portion of the unit's condenser coil 15 is located within the opening so that outside air can be drawn by the condenser fan (not shown) over the heat exchange surfaces of the condenser coil.

Figure 2:
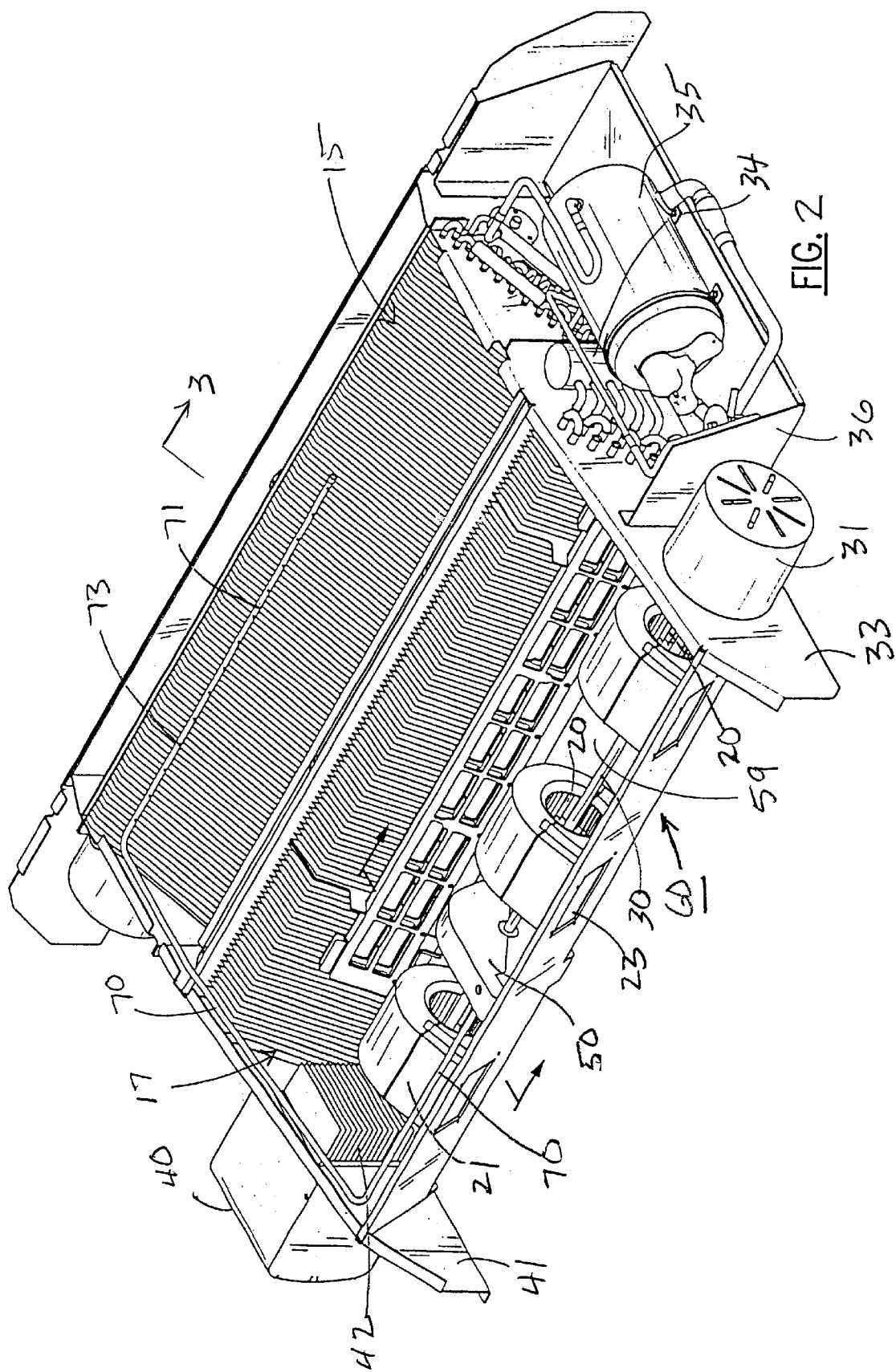
FIG. 2 is an enlarged perspective view of the air conditioning unit shown in FIG. 1 with the cover removed to better illustrate the internal components of the unit.

The unit is illustrated in FIG. 2 with the outer cover removed. To more clearly show the component parts of the unit, the evaporator coil 17 of the unit is located directly in front of the condenser coil 15. The heat exchanger fins of the two coils are contoured to provide a maximum amount of heat exchanger surface area within a minimum amount of available space. The coil fins are set at an angle to lower the overall height of the unit. As noted above, outside air is drawn over the surfaces of the condenser coil and is discharged through the back of the housing.

Figure 3:
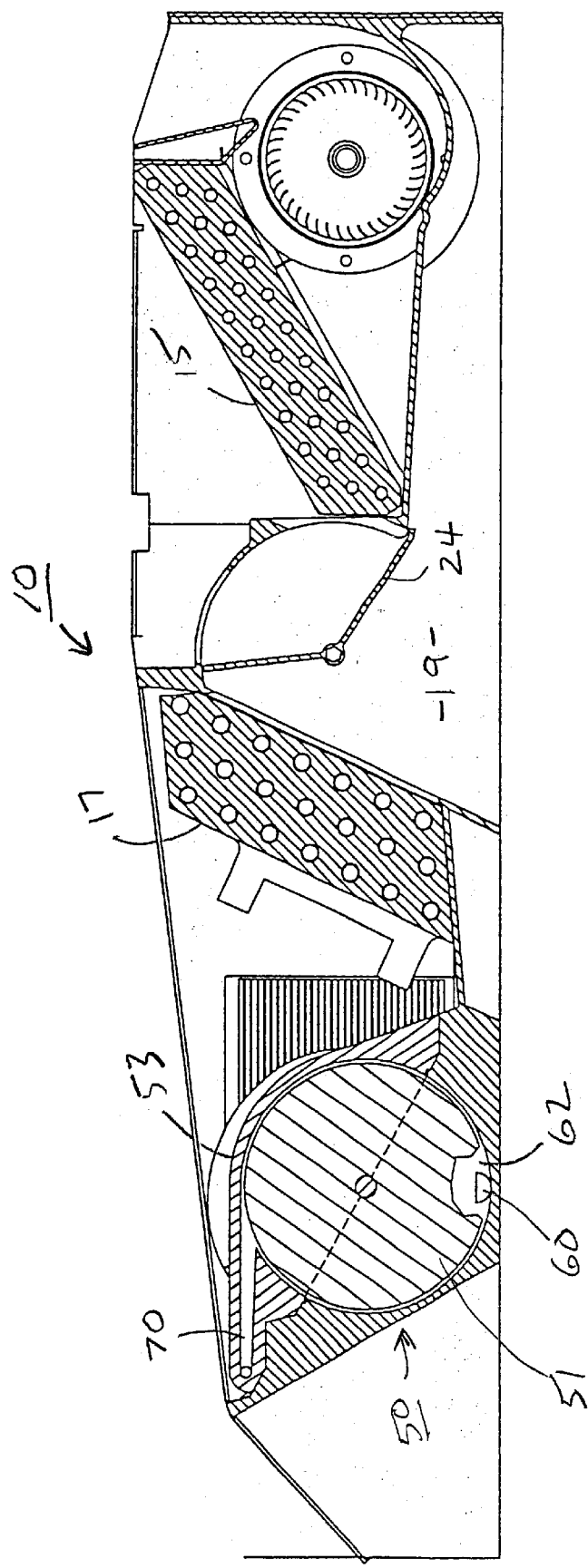
FIG. 3 is a side sectional view taken through the unit shown in FIG. 2.

As shown in FIGS. 2 and 3 a return air duct 19 is provided in the unit between the two coils. A series of cylindrical blower wheels 20 are positioned in front of the evaporator coil and each blower is contained within a separate blower wheel housing 21. The blower wheels are arranged to draw return air from the passenger compartment into the duct 19 and then through the evaporator coil. The conditioned supply air is then directed back into the passenger compartment through supply air ports 23. An adjustable damper 24 is located in the return air duct 19 that can be positioned to regulate the addition of outside air to the return air stream being drawn from inside the bus.

Each blower wheel is secured to a common drive shaft 30 and the drive shaft is rotated by a single electric motor 31 that is mounted upon the outside of the side panel 33 of the air conditioning unit.

An electrically driven compressor 35 is mounted within a bracket 36 and the bracket secured to side wall 33. The compressor is connected to the two heat exchanger coils of the unit by suitable refrigerant lines and the refrigerant is throttled from the high pressure side of the system via an expansion valve 34. A compressor operates in a conventional manner to bring refrigerant from the lower pressure side of the air conditioning system to the high pressure side. The compressor 35 as well as motor 31 and condenser fan motor (not shown) are all powered by a regulated electrical input from an inverter 40 which is secured to the other side panel 41 of the unit. The inverter contains a series of cooling fins 42 that extend into the evaporator region for maintaining the inverter at a desired operating temperature. Although, not shown, power to the inverter is provided by a generator that is driven by the engine of the vehicle.

A condensate pump, generally referenced 50, is mounted in front of the evaporator coil 17 in coaxial alignment with the blower wheels 20. As illustrated in FIGS. 2 and 3, the pump includes a flat faced circular disc 51 that is secured to the drive shaft 30 which services the evaporator blowers. The disc is contained within a housing that includes a main body section 53. An inlet port 60 is provided in the main body section of the housing through which condensate from the evaporator coil is permitted to enter the lower sump region 62 of the pump cavity. A drip pan 59 is located beneath the evaporator coil. The floor of the pan slopes downwardly toward the inlet port of the pump so that any condensate that is collected is directed into the sump of the pump housing. A discharge tube 70 is connected into the upper chamber of the housing, and as illustrated in FIG. 2, the tube extends back around the evaporator coil and terminates in a planar end section 71 that is adjacent to the upper surface of the condenser coil 15. A series of discharge ports 73 are placed in the end section of the tube which are arranged to discharge condensate over the heat exchanger surfaces of the condenser coil. As a result, the condensate is evaporated and the water vapor is discharged from the unit through the opening in the upper part of the cover.

Figure 4:
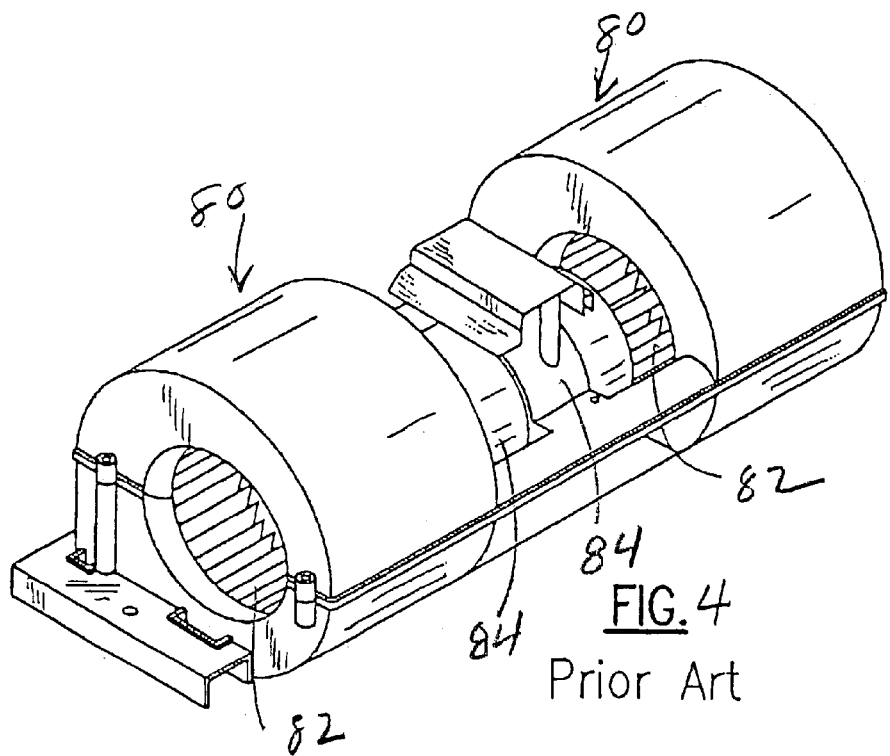
FIG. 4 is a perspective view of a typical prior art double radial blower arrangement.
Figure 5:
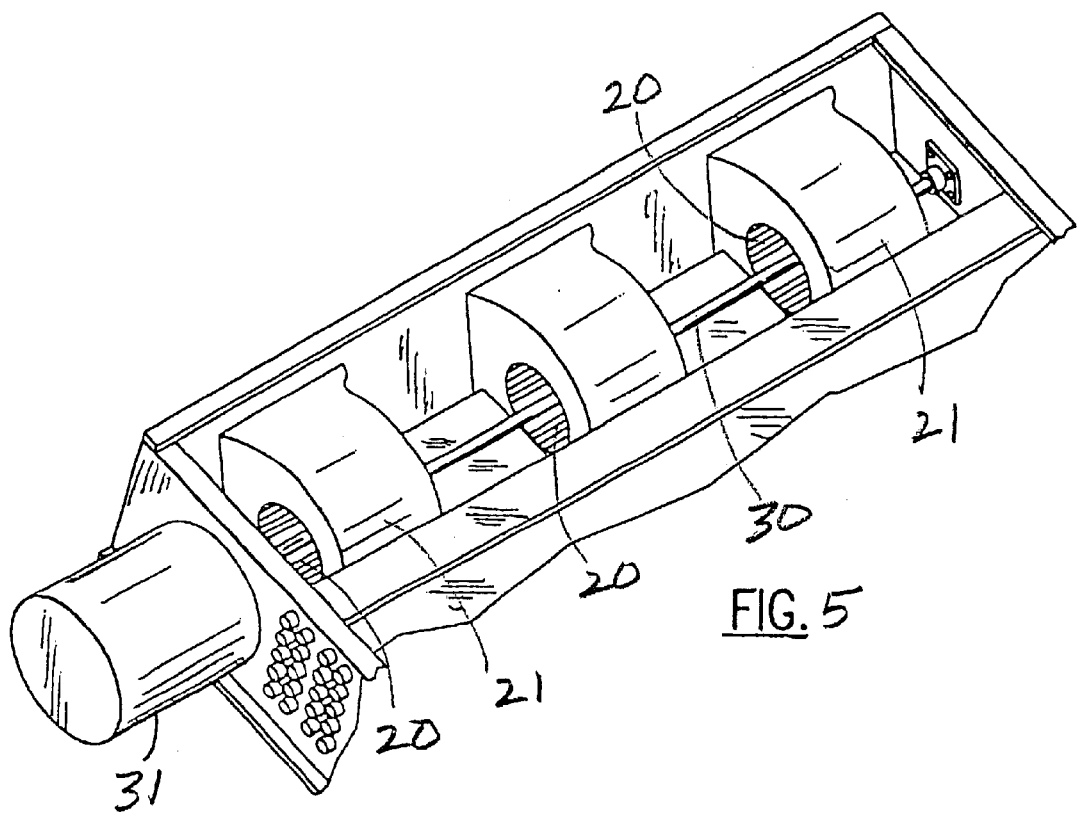
FIG. 5 is a partial perspective view illustrating a blower design used in the rooftop unit of the present invention.

As shown in FIG. 4, the conventional prior art air conditioning units on a bus utilize multiple radial blowers 80 having blower wheels 82 which each contain a dedicated blower motor 84 which is contained within the evaporator housing. In the present invention (FIGS. 2 and 5) a single blower motor 31 is mounted on the outside of the evaporator support and drives an elongated blower shaft 30 which drives the of blower wheels 20 for all of the blowers. This configuration reduces the number of blower motors and wiring and therefore improves reliability and cost. Because of a single motor and its convenient location, serviceability and accessability are also improved.

As can also be seen from the above description, in this arrangement of components, there is no need to pass refrigerant lines through the passenger compartment of the bus. Accordingly, the chance of moisture generated by refrigerant lines within the passenger compartment is eliminated.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A compact rooftop air conditioning unit for a vehicle, said unit having an evaporator coil mounted in front of a condenser coil, wherein said unit further includes:

an electrical compressor for moving refrigerant between said coils;

a plurality of cylindrical blowers mounted upon a single horizontally disposed shaft for moving return air from inside the vehicle through the evaporator coil;

a single electrical drive motor for turning said shaft;

an inverter for controlling the electrical input to said compressor and said drive means; and a pump means secured to said shaft for pumping condensate generated by the evaporator coil over the surface of the condenser coil.

2. The air conditioning unit of claim 1 which said drive motor is positioned on the outside of the evaporator coil mounting.

3. The unit of claim 1 in which two cylindrical blowers are used.

4. The unit of claim 1 in which three cylindrical blowers are used.

5. A compact roof top air conditioning unit for a vehicle, said unit having an evaporator coil mounted in front of a condenser coil, wherein said unit further includes:

a plurality of cylindrical blowers mounted upon a single horizontally disposed shaft for moving return air from a conditioned region inside said vehicle over the evaporator coil;

a single electrical drive motor for turning said shaft and driving said blowers, with said drive motor positioned on the outside of the evaporator coil mounting for ease of servicing; and a drip pan mounted beneath the evaporator coil, said drip pan having a trough for conducting condensate away from the evaporator coil.

6. The unit of claim 5 in which three cylindrical blowers are used.

* * * * *